United States Patent
Du et al.

(10) Patent No.: US 9,042,599 B2
(45) Date of Patent: May 26, 2015

(54) TECHNIQUES FOR FACE DETECTION AND TRACKING

(75) Inventors: Yangzhou Du, Beijing (CN); Qiang Eric Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 12/997,300

(22) PCT Filed: Jul. 2, 2010

(86) PCT No.: PCT/CN2010/000997
§ 371 (c)(1),
(2), (4) Date: Dec. 10, 2010

(87) PCT Pub. No.: WO2012/000135
PCT Pub. Date: Jan. 5, 2012

(65) Prior Publication Data
US 2012/0114172 A1    May 10, 2012

(51) Int. Cl.
*G06K 9/00* (2006.01)
(52) U.S. Cl.
CPC ........ *G06K 9/00248* (2013.01); *G06K 9/00993* (2013.01)

(58) Field of Classification Search
None
See application file for complete search history.

(56) References Cited

U.S. PATENT DOCUMENTS

| | | | |
|---|---|---|---|
| 6,795,567 B1 * | 9/2004 | Cham et al. | 382/103 |
| 7,184,602 B2 * | 2/2007 | Cohen et al. | 382/243 |
| 7,769,772 B2 * | 8/2010 | Weyl et al. | 707/765 |
| 8,270,476 B2 * | 9/2012 | Schmit et al. | 375/240.1 |
| 2004/0218827 A1 * | 11/2004 | Cohen et al. | 382/243 |
| 2008/0063263 A1 * | 3/2008 | Zhang et al. | 382/159 |
| 2009/0169065 A1 * | 7/2009 | Wang et al. | 382/118 |
| 2010/0060727 A1 * | 3/2010 | Steinberg et al. | 348/77 |
| 2011/0255743 A1 * | 10/2011 | Guan et al. | 382/103 |

OTHER PUBLICATIONS

CN101281599 ( English translation); Oct. 8, 2008.*
Robust Real-Time Face Detection, Viola and Jones et al Jul. 11, 2003.*
CN 101236599 English translation ,Dec. 29, 2007.*

* cited by examiner

*Primary Examiner* — Nancy Bitar
(74) *Attorney, Agent, or Firm* — Trop, Pruner & Hu, P.C.

(57) ABSTRACT

Techniques are disclosed that involve face detection. For instance, face detection tasks may be decomposed into sets of one or more sub-tasks. In turn the sub-tasks of the sets may be allocated across multiple image frames. This allocation may be based on a resource budget. In addition, face tracking tasks may be performed.

18 Claims, 10 Drawing Sheets

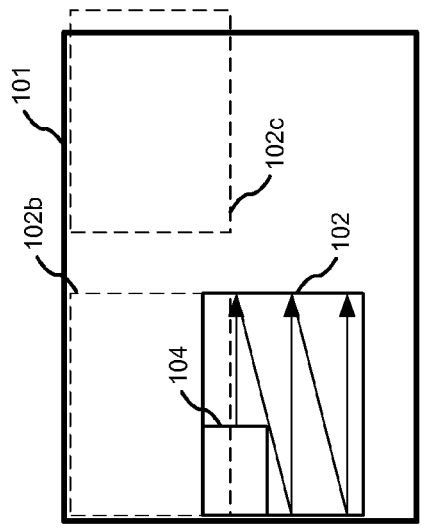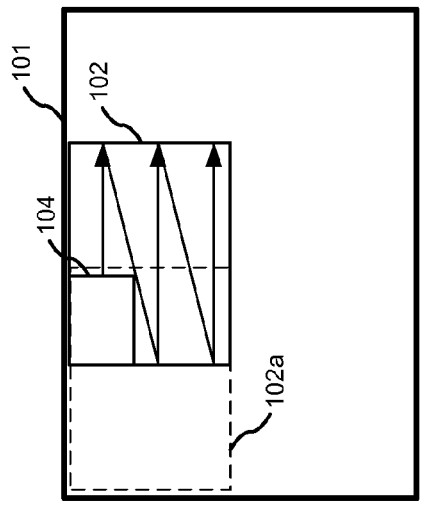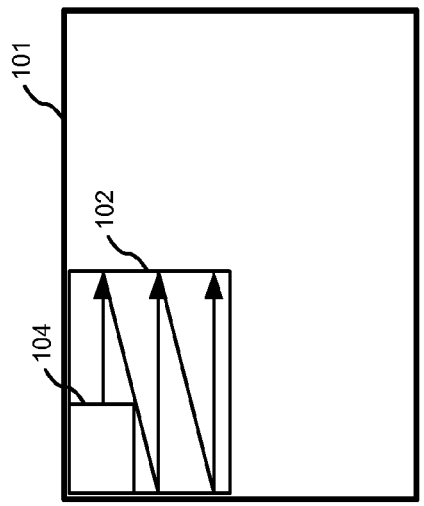

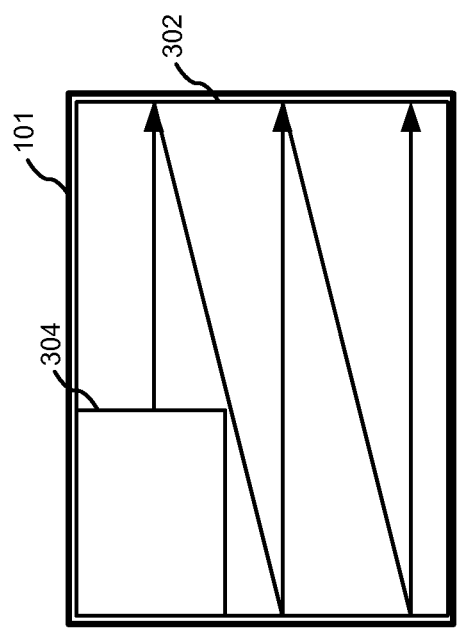

ns may advantageously achieve improved load balance over time, as well as provide highly accurate detection and tracking. Further, these techniques may provide a computational load that is independent of image size.

TECHNIQUES FOR FACE DETECTION AND TRACKING

BACKGROUND

Devices such as digital cameras and camera phones often provide a face detection mode. In this mode, a camera detects a face in a scene and then automatically focuses (AF) and optimizes exposure (AE). Even if a person moves, the camera will track the detected face, focus on it and adjust exposure accordingly. As result, face detection and tracking provide much convenience to a photographer when taking a portrait scene.

Though the terms of "face detection" and "face tracking" are often undistinguished in product advertisements, they are largely different in a technical view. While face detection typically works in the entire area of the image to discover newly appeared faces, face tracking typically works in a very small neighboring area of an old face and probes its movement. Therefore, a single face tracking may take much less computation (e.g., 2-3 orders of magnitude less) than a full image face detection.

Face detection and tracking features may be implemented in mobile platforms (e.g., cameras and camera phones) as an embedded software solution, or as a hardware-accelerated version (IP core) to provide accelerated speed performance. However, providing these features in an effective manner can be computationally challenging.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 1A-1C are diagrams of exemplary face detection techniques;

FIG. 3 is a diagram of an exemplary face detection technique;

DETAILED DESCRIPTION

Figure 2B:
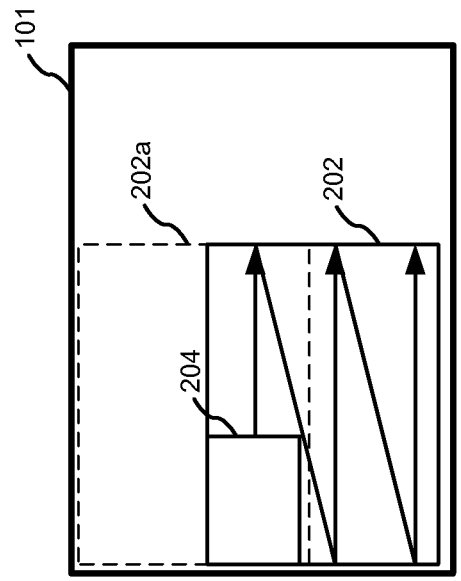
FIGS. 2A and 2B are diagrams of an exemplary face detection techniques.

Embodiments provide techniques that involve face detection. For instance, face detection tasks may be decomposed into sets of one or more sub-tasks. In turn the sub-tasks of the sets may be allocated across multiple image frames. This allocation may be based on a resource budget. In addition, face tracking tasks may be performed.

These techniques may improve performance efficiency for face detection and tracking, detecting both large and small faces. Typically, digital cameras and camera phones limit the minimum size of detected faces to be approximately one-tenth to one-eighth of the image height. However, this prevents the detection of small faces (e.g., in images containing a group of people). The techniques disclosed herein may advantageously detect faces of all sizes. Moreover, these techniques may advantageously achieve improved load balance over time, as well as provide highly accurate detection and tracking. Further, these techniques may provide a computational load that is independent of image size.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Embodiments provide techniques that break down large face detection task into smaller sub-tasks. Also, embodiments provide techniques that fuse face detection and tracking. Such techniques may advantageously reduce imbalanced processing loads over time, as explained above that face detection takes much more time than face tracking. This may result in a better user experience (e.g., through the reduction or elimination of noticeable performance jitters).

Many devices currently employ real-time face detection techniques that are based on the well known techniques of Viola and Jones, which were published as Paul Viola and Michael Jones, *Rapid Object Detection using a Boosted Cascade of Simple Features*, Accepted Conference on Computer Vision and Pattern Recognition, 2001. These techniques use a cascade of Adaptive Boosting (AdaBoost) classifiers to detect faces by scanning a window exhaustively over an image.

More particularly, Viola and Jones' techniques may employ an image representation called an integral image, which allows for the quick computation of features used by the detector. A learning algorithm, based on AdaBoost, selects a small number of critical visual features from a larger set to yield efficient classifiers. In turn, these techniques combine increasingly complex classifiers in a cascaded manner. As a result, background regions of the image may be quickly discarded while computation is dedicated to more promising object-like regions. Thus, according to Viola and Jones' techniques, the cascading of classifiers can be viewed as an object specific focus-of-attention mechanism.

These techniques may be computationally intensive. For instance, in a 2.4 GHz Intel® Core™ 2Duo platform (available from Intel Corporation of Santa Clara, Calif.), an implementation of Viola and Jones' algorithm (using the OpenCV library) may take around 100 milliseconds at an image resolution of 320×240 pixels.

As discussed above, face detection and face tracking (while often undistinguished in product advertisement) are largely different in a technical view. More particularly, face detection works in the entire area of an image to discover newly appeared faces. However, face tracking works in a very small neighboring area of an old face and probes its movement.

Therefore, tracking of a single face may take much less computation (e.g., 2~3 orders of magnitude less) than a full image face detection. Thus, for a video stream (e.g., the preview mode of digital camera), it is not computationally economical to run full image face detection in every frame.

To save computation, face detection may be periodically run at an interval of a small amount of frames (e.g., 30 frames) and face tracking is called continuously during this interval. However, this may unfortunately lead to an imbalanced processing load over time, due to face detection taking substantially more time than face tracking. Moreover, in platforms with reduced computational capacities (e.g., less capacity than personal computers), face detection in large images may block the system for a short period of time. As a result, user-perceptible jitters may occur.

As described herein, face detection (e.g., in accordance with Viola and Jones' techniques) may involve scanning a window (e.g., a rectangular window) over an entire image area to detect faces. To discover faces of different sizes (e.g., large and small), such scanning may be repeatedly performed using different window sizes. For instance, scanning may be repeatedly performed from a smallest window size (e.g., 20×20 pixels) to a largest window size covering an entire image area.

In embodiments, such scanning may be broken down into smaller tasks. In turn, these smaller tasks may be distributed across and performed in multiple image frames. Thus, through this feature, system blocking due to multiple size face detection may be advantageously avoided.

However, breaking down a face detection operation into smaller tasks is not a trivial matter. For instance, dividing an image area into equal blocks and independently performing face detection on each block is ineffective. This is because this approach cannot handle situations where a face appears at the boundary of two blocks. Moreover, overlaying such blocks doesn't overcome this problem because it is not known how much two blocks should be overlaid (due to the sizes of emerging face(s) being unknown). Further, this approach cannot handle the situation where a face is larger than a divided image block. Another approach involves performing single-scale face detection for each frame. However, detecting small faces over the image takes more time than detecting large faces. This can cause an imbalanced workload over time.

Embodiments employ a task decomposition technique that breaks a face detection task into multiple sub-tasks. These sub-tasks may each be performed for a corresponding frame in a sequence of image frames. Each sub-task employs a corresponding detection region. The detection region is a portion (e.g., a rectangle) of an image space. Thus, each sub-task performs face detection within its corresponding detection region. This involves scanning a detection window (e.g., a rectangular portion of the corresponding detection region) through the sub-task's detection region.

Successive sub-tasks employ detection regions that may partially overlap with previous detection regions of previous sub-tasks. Such successive sub-tasks may be performed to cover an entire image area.

Moreover, sub-tasks may employ detection regions and detection windows of various sizes. For instance, sets of sub-tasks may be employed, where each set employs a particular detection region size and a particular detection window size. Each set includes sub-task(s) to cover an entire image area. This feature advantageously provides for the detection of different size faces.

FIG. 1A-3 are diagrams illustrating this task decomposition approach. Each of these diagrams shows a sub-task. For instance, each of FIGS. 1A-1C illustrate a sub-task within a first set of sub-tasks, each of FIGS. 2A and 2B illustrate a sub-task within a second set of sub-tasks, and FIG. 3 shows a third set having single sub-task. The sub-tasks of FIGS. 1A-3 are performed on an image space 101.

As shown in FIGS. 1A-1C, a detection region 102 is positioned in different locations of image space 101. Within detection region 102, a detection window 104 is scanned in the performance of face detection operations. As described herein, the location of detection regions for a set of sub-tasks may partially overlap. Thus, each of FIGS. 1A-1C shows (with dotted lines) other positions of detection region 102 (e.g., positions 102a-c). These other positions are employed in other sub-tasks of the corresponding set.

Figure 2A:
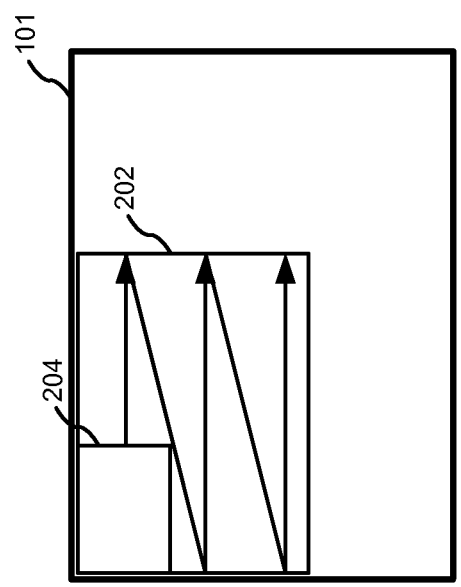

FIGS. 2A and 2B show a detection region 202 positioned in different locations of image space 101. Within detection region 202, a detection window 204 is scanned in the performance of face detection operations. As described herein, the location of detection windows for a set of sub-tasks may partially overlap. Thus, each of FIGS. 2A and 2B shows (with dotted lines) other positions of detection region 202 (e.g., position 202a). These other positions are employed in other sub-tasks of the corresponding set.

FIG. 3 shows a detection region 302 that covers (or substantially covers) image space 101. Thus, the sub-task set of FIG. 3 composes a single sub-task. Accordingly, within detection region 302, a detection window 304 is scanned to perform face detection operations.

Thus, within each set of sub-tasks, the detection region changes its position after each sub-task is performed. Although FIGS. 1A-3 show detection regions moving from left to right in descending rows, other patterns may be employed. Moreover, FIGS. 1A-3 show a similar window scanning pattern (left to right in descending rows). However, other scanning patterns may be employed.

The examples of FIGS. 1A-3 show detection regions of different sizes. In embodiments, each set of sub-tasks may employ a particular detection region size. For instance, embodiments may employ detection region sizes that grow progressively larger for each successive set. As an example, the detection region size and the detection window size may each be scaled by a coefficient (e.g., 1.2) for each successive set. This may continue until a set is reached having a detection window size large enough to cover a predetermined maximum-possible face size. Alternatively or additionally, this may continue until a set is reached having a detection region size that covers an entire image space.

In embodiments, the number of image frames it takes to complete all the sets of sub-tasks is called a detection cycle. Various detection cycles may be employed. An exemplary detection cycle is 30 frames.

Figure 4:
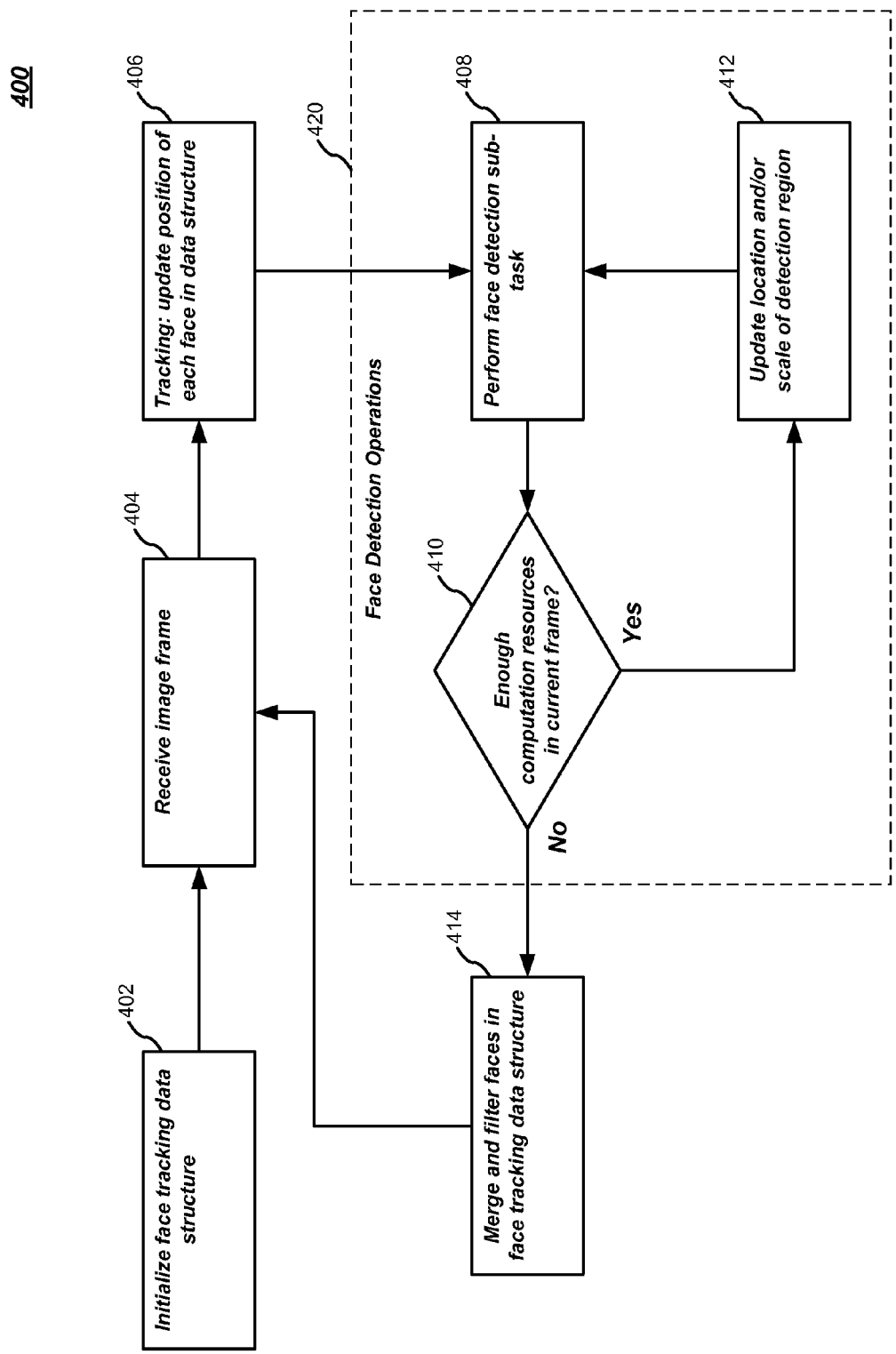
FIGS. 4 and 5 are logic flow diagrams.

As described herein, embodiments provide face detection and face tracking operations. These operations may be combined. Exemplary techniques for face detection and face tracking are described below with reference to FIG. 4. In particular, FIG. 4 illustrates an exemplary logic flow 400, which may be representative of operations executed by one or more embodiments.

At a block 402, a face tracking data structure is initialized. The face tracking data structure may maintain various information regarding detected faces. Examples of such information include face location and face size. Further information, such as data regarding particular facial features may also be maintained. Embodiments, however, are not limited to these examples. Face tracking data structures may be implemented in various ways. Exemplary data structures include (but are not limited to) queues, linked lists, arrays, container class objects, and so forth.

At a block 404, an image frame is received. This image frame may be in a sequence of frames (e.g., in a video stream). As described herein, such sequences may be received from an image sensor operating in a camera preview mode.

Tracking operations are performed at a block 406. These operations may involve searching for previously detected face(s) (as indicated by the face tracking data structure). Thus, the position of each face (as well as other information) in the data structure may be updated (if the face is still present). This tracking may involve performing face detection operations within neighboring image space areas of the previously detected face(s). Such operations may involve scanning within these areas. Such scanning may employ Viola and Jones' techniques. Also, such scanning may employ window sizes corresponding to the previously detected face(s). Embodiments, however, are not limited to these examples.

FIG. 4 shows that face detection operations are performed within a block 420. These operations are in accordance with the task decomposition techniques described herein. For instance, at a block 408, a face detection sub-task is performed. This may involve scanning a detection window through a detection region. Such scanning may employ Viola and Jones' techniques.

As indicated by a block 410, it is determined whether there are sufficient computational resources available in the current frame. This may involve tracking the computational resources (e.g., instructions, and/or time) already consumed during the current frame for face detection and determining whether there are sufficient resources within a predetermined computational resource budget to proceed with another face detection sub-task.

Thus, a threshold may be defined so that the workload of face detection in a current frame will approach but not exceed this threshold. In embodiments, each sub-task does not consume equal resources. Therefore the detection loop with block 420 may advantageously aggregate tasks (e.g., multiple small tasks) to achieve a more balanced workload over time.

If sufficient computational resources exist in the current frame, then operation proceeds from block 410 to a block 412. At block 412, the location and/or scale (e.g., size) of the detection region is updated. For instance, within a particular set of sub-tasks, the detection region location may be updated. However, when transitioning between sets, one or both of the detection region and the detection region scale may be updated. Following block 412, operation returns to block 408. At this point, a sub-task is performed based on the updated detection region location and/or size.

If sufficient computational resources do not exist in the current frame, then operation proceeds from block 410 to a block 414. At block 414, the face tracking data structure is updated. This may comprise adding newly detected faces into the data structure, and changing data regarding previously detected faces (tracked faces) in the data structure. Further, block 414 may involve merging and/or filtering of faces in the data structure. This is because newly detected faces may overlap with previously detected faces. For instance, a particular face can be detected multiple times at similar scales. Also, an old face can also move into a different detection region. Such merging and filtering may be based on feature data that is generated with each detected face. However, other techniques may be employed.

FIG. 4 shows that, following block 414, operation returns to block 404. At this point, a further image frame is received. Based on this further image frame, the face tracking and detection operations described herein may be performed again.

Figure 5:
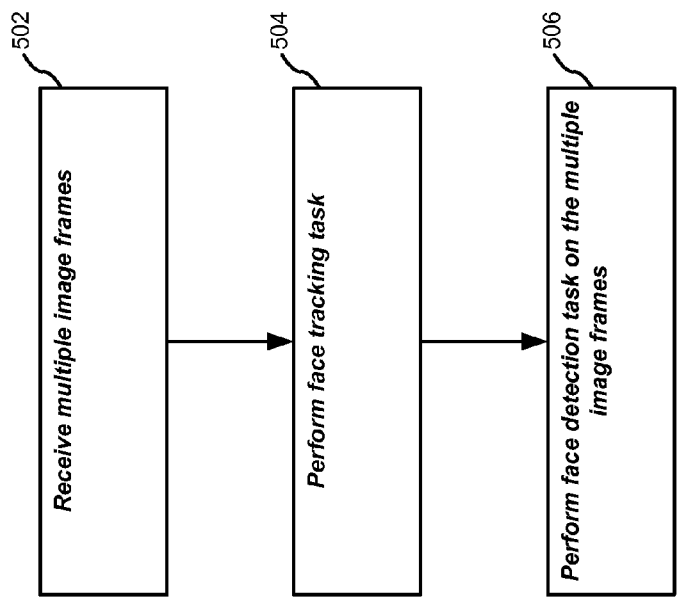

FIG. 5 illustrates an exemplary logic flow 500, which may be representative of various task decomposition operations performed by one or more embodiments. For example, these operations may be performed by the exemplary apparatus and implementations described below with reference to FIGS. 7 and 8. Embodiments, however, are not limited to the examples of FIGS. 7 and 8.

At a block 502, multiple image frames are received. These frames may be received, for example, from an image sensor. For example, these frames may be a sequence of frames (e.g., a video stream). This sequence may be generated by the image sensor when operating in a digital camera preview mode. Embodiments, however, are not limited to these examples.

At a block 504, face tracking is performed. This may involve scanning for previously detected faces within neighboring areas of their previous detection.

At a block 506, a face detection task is performed on the multiple image frames. This face detection task is decomposed into multiple sets of one or more sub-tasks. This decomposition may employ the techniques described above with reference to FIGS. 1A-3.

For instance, each of the sets may employ a corresponding detection region size. Thus, each sub-task may involve scanning a window within a detection region having the detection region size of the corresponding set.

These sub-tasks are performed across the plurality of image frames. Thus, block 506 may involve each sub-task being performed with a corresponding frame from the frames received at block 502.

Figure 6A:
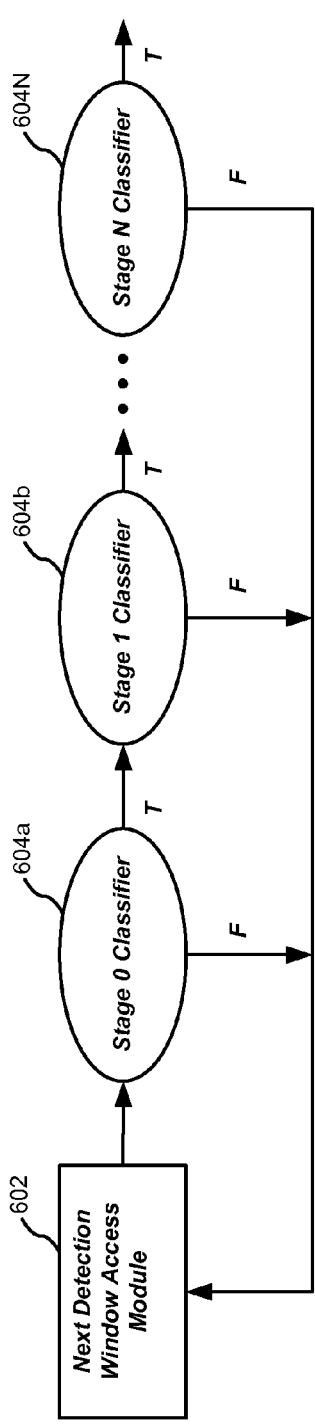
FIGS. 6A and 6B are diagrams of exemplary classification techniques.

As described herein, embodiments may employ Viola and Jones' face detection techniques, which use an AdaBoost method for face classification in each detection window. As shown in FIG. 6A, this method uses a cascade structure having a series of stage classifiers.

In particular, FIG. 6A shows an implementation that includes a next detection window access module 602, and multiple stages of classifiers 604a-N. These elements may be implemented in any combination of hardware and/or software.

For each detection window, a Haar-like feature may be used for weak classifiers. Haar-like features can detect an edge or a line feature and resemble the Haar basis function. By combining a set of weak classifiers, a boosted strong classifier can detect more complicated objects such as faces.

FIG. 6A shows that when a detection window goes through the cascade structure of classifiers, no opportunity of data parallelism exists. This is because the Haar-like features only operate on a single rectangle region.

However, embodiments may provide parallelism features. This makes face detection friendly to single instruction, multiple data (SIMD) environments. Unlike processing detection windows one by one (as shown in FIG. 6A), all of the candidate detection windows are collected after a preceding classification stage. Then, they are sent together to a next classification stage.

Figure 6B:
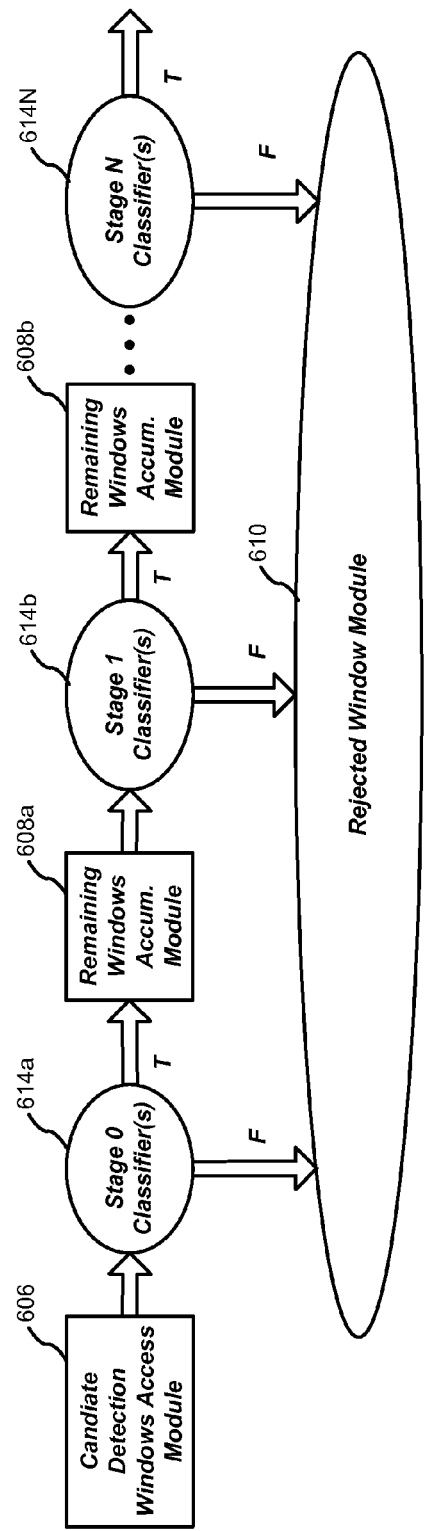

An example of this parallelism is illustrated in FIG. 6B. In particular, FIG. 6B shows an implementation that includes a candidate detection windows access module 606, multiple classifier stages 614a-N (each including one or more classifier modules), and multiple remaining windows access modules 608a-b. These elements may be implemented in any combination of hardware and/or software.

As described above, each of classifier stages 614a-N in FIG. 6B may include multiple classifier modules. This advantageously allows for multiple windows to be operated on concurrently. Thus, in FIG. 6B, module 606 accumulates data of multiple detection windows. In turn, this data is passed to classification stage 614a, where the multiple detection windows may be operated upon concurrently. Following this, each of the windows may be either accumulated at remaining windows accumulation module 608a, or discarded (e.g., at rejected window module 610). Moreover, FIG. 6B shows that this procedure may be employed for successive classification stages.

Figure 7:
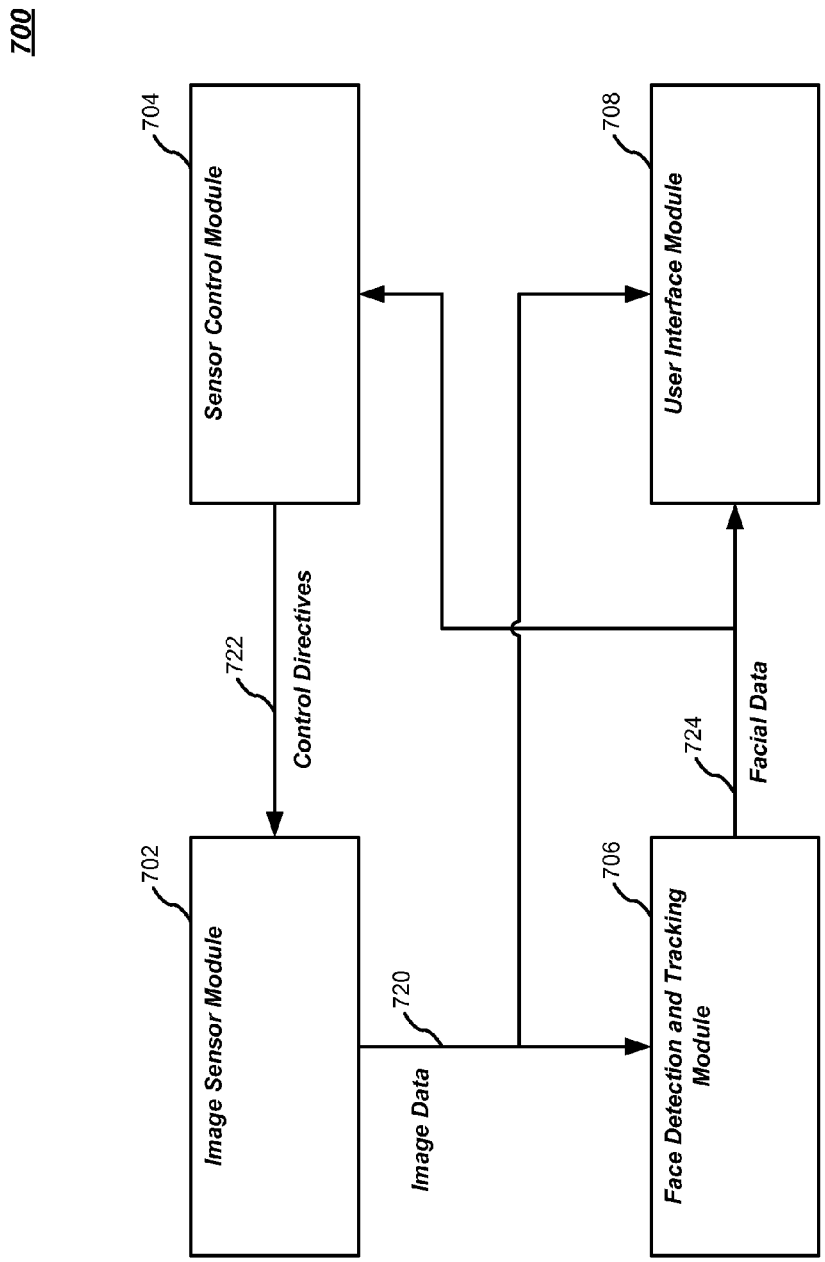
FIG. 7 is a diagram of an exemplary apparatus.

FIG. 7 is a diagram of an apparatus 700 that may employ the techniques described herein. Apparatus 700 may include an image sensor module 702, a sensor control module 704, a face detection and tracking module 706, and a user interface module 708. These elements may be implemented in any combination of hardware and/or software.

Image sensor module 702 generates image data 720 in the form of one or more image frames. These frames are sent to face detection and tracking module 706. In turn face tracking and detection module 706 may detect and track faces from these frames in accordance with the techniques described herein.

Image sensor module 702 may include various components. Exemplary components include (but are not limited to) an optics assembly, an image sensor, and an image/video encoder. These components may be implemented in any combination of hardware and/or software.

The optics assembly may include one or more optical devices (e.g., lenses, mirrors, etc.) to project an image within a field of view onto multiple sensor elements within the image sensor. In addition, the optics assembly may include mechanism(s) to control the arrangement of these optical device(s). For example, such mechanisms may control focusing operations, aperture settings, exposure settings, zooming operations, shutter speed, effective focal length, etc. Embodiments, however, are not limited to these examples. Such control may be based on control directives 722 received from sensor control module 704.

The image sensor may include an array of sensor elements (not shown). These elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. Settings for these operations may be based on control directives 722 received from sensor control module 704.

Thus, the image sensor converts light received through optics assembly into pixel values. Each of these pixel values represents a particular light intensity at the corresponding sensor element. Although these pixel values have been described as digital, they may alternatively be analog. As described above, image sensor module 702 may include an image/video encoder to encode and/or compress pixel values. Various techniques, standards, and/or formats (e.g., MPEG, JPEG, etc.) may be employed for this encoding and/or compression.

Face detection and tracking module 706 receives image data 720. Image data 720 may be in the form of one or more frames. In turn, module 706 performs face detects and tracks faces in accordance with the techniques described herein. Based on this, face detection and tracking module 706 generates corresponding facial data 724. Facial data 724 indicates faces detected and/or tracked within the image data 720. Also, facial data 724 may provide information (location, size, depth, and/or other features) regarding such faces. In embodiments, facial data 724 may be in the form of a face tracking data structure (e.g., as described above with reference to FIG. 4).

FIG. 7 shows that facial data 724 is sent to sensor control module 704. As described above, sensor control module 704 may generate control directives 722, which are provided to sensor module 702. These control directives may establish particular operational characteristics (e.g., focus and/or exposure settings) of sensor module 702. In embodiments, the generation of control directives 722 may be based at least upon facial data 724 (e.g., on the location, size, depth, and/or other features of faces).

User interface module 708 facilitates user interaction with apparatus 700. This interaction may involve the input of information from a user and/or the output of information to a user. Accordingly, user interface module 708 may include one or more devices, such as a keypad, a touch screen, a microphone, and/or an audio speaker. In addition, user interface module 708 may include a display to output information and/or render images/video processed by apparatus 700. Exemplary displays include liquid crystal displays (LCDs), light emitting diode (LED) displays, plasma displays, and video displays.

This display may output frames generated during a preview mode of operation. Additionally, based on operations performed by face detection and tracking module 706, the display may indicate the presence of faces (e.g., by outputting rectangles or other shapes). Accordingly, FIG. 7 shows user interface module 708 receiving image data 720 and facial data 724.

Figure 8:
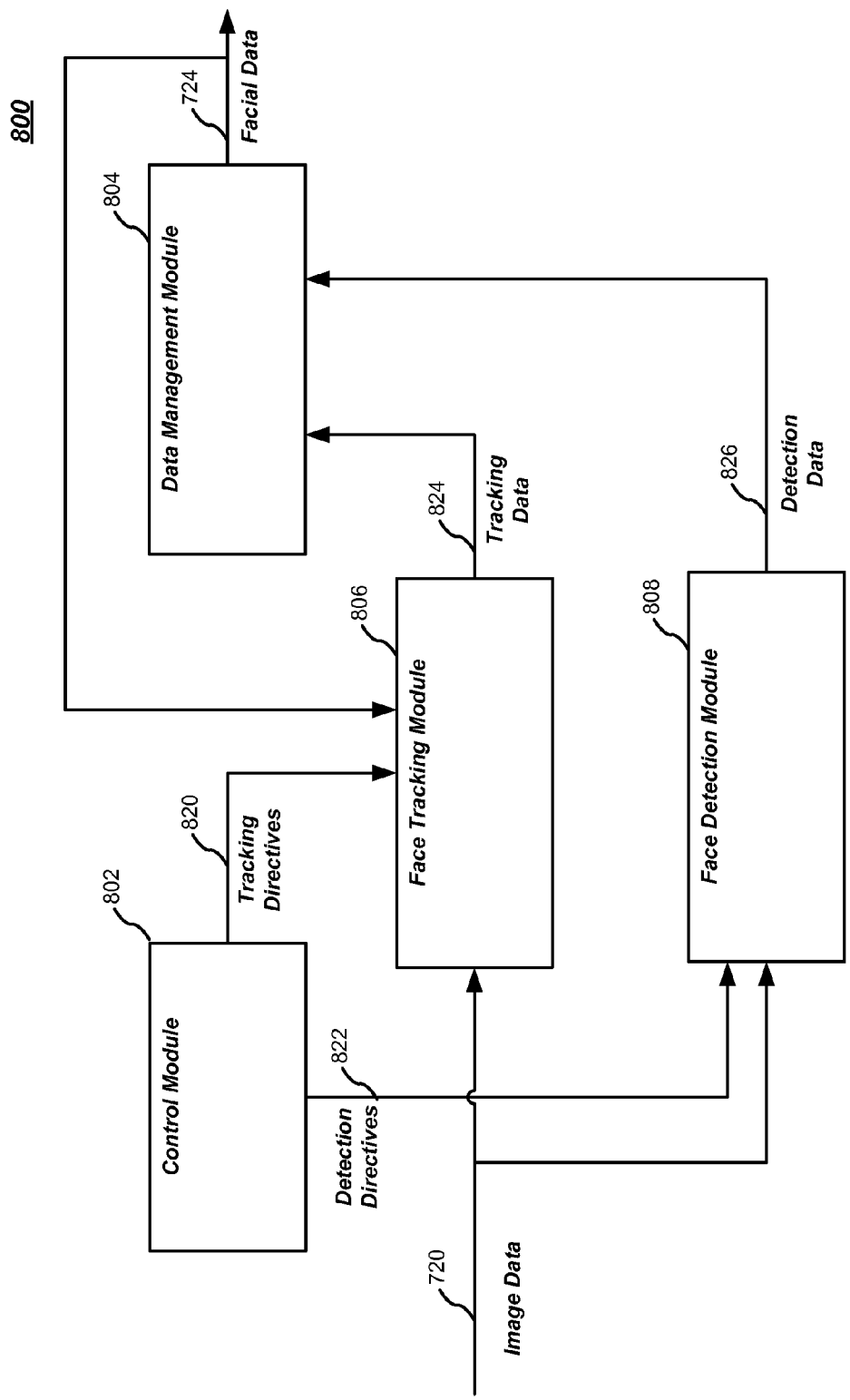
FIG. 8 is a diagram of an exemplary implementation.

FIG. 8 is a diagram of an implementation 800 that may be employed in face detection and tracking module 706. Implementation 800 may include a control module 802, a data management module 804, a face tracking module 806, and a face detection module 808. These elements may be implemented in any combination of hardware and/or software.

Control module 802 controls operations of face tracking module 806 and face detection module 808. For instance, FIG. 8 shows control module 802 sending tracking directives 820 to face tracking module 806. These directives may instruct face tracking module to perform tracking operations. Also, FIG. 8 shows control module 802 sending detection directives 822 to face detection module 808. These directives may instruct face detection module 808 to perform one or more detection sub-tasks. In embodiments, these directives may be made in accordance with resource budgets allocated for each image frame.

Data management module 804 maintains a face tracking data structure. This data structure is based on tracking data 824 received from face tracking module 806 and detection data 826 received from face detection module 808. Accordingly, data management module 804 may merge and/or filter information contained in this received data. As a result, FIG. 8 shows data management module 804 generating facial data 724.

Face tracking module 806 receives image data 720 and performs face tracking operations, as described herein. This may involve tracking previously detected faces in neighborhoods of their previously known locations. Information regarding previously detected faces may be received from data management module 804 as facial data 724. In embodiments, the tracking operations performed by face tracking module 806 may employ Viola and Jones' techniques.

Face detection module 808 receives image data 720 and performs face detection operations, as described herein. As a result, face detection module 808 generates detection data 826, which is sent to data management module 804. Detection data 826 may indicate detected faces and corresponding information (e.g., characteristics of detected faces). The face detection operations may employ the well known Viola and Jones' techniques. Accordingly, face detection module 808 may include the classifier arrangements of FIGS. 6A and/or 6B. Moreover, face detection module 808 may perform face detection according to the decomposition techniques described herein.

As described above, embodiments may advantageously provide enhanced performance over conventional techniques. For example, Table 1, below, provides performance data for different face detection and/or tracking techniques. This data is represented in frames per second, which indicates how fast the face detection and/or face tracking techniques process video frames.

Each row of Table 1 corresponds to a different video sequence (except for the bottom row, which provides average data). These video sequences were each VGA (640×480 size) video. This video size is commonly used by digital cameras in preview mode.

Each column of Table 1 provides performance data for a different technique. For instance, the second column provides data for pure face detection according to the Viola and Jones' techniques. The third column provides data for a combination of face detection and tracking according to the techniques described herein (e.g., in accordance with FIGS. 4 and 5. Further, the fourth column provides data for a combination of face detection and tracking according to the techniques described herein, but with SIMD enhancements. The data in Table 1 reflects performance of an Intel® Menlow platform with a 1.6 GHz Atom™ processor. Moreover, this data was generated using a 60×60 minimal detection window and a detection cycle of 30 frames.

TABLE 1

Performance gains for VGA size video

| VGA Video | Pure Detection (fps) | Fusion of Detection and Tracking (fps) | Detection and Tracking with SIMD customization (fps) |
|---|---|---|---|
| Video-1 | 10 | 141 | 264 |
| Video-2 | 11 | 70 | 146 |
| Video-3 | 12 | 93 | 197 |
| Video-4 | 12 | 36 | 85 |
| Average | 11 | 85 | 173 |

As shown in Table 1, the technique of the third column (combination of face detection and tracking) is about 16 times faster than the pure face detection algorithm (running full face detection in each frame). Further, through data structure adjustment and SIMD optimization, the fourth column shows an additional 2 times performance gain.

In addition to the performance gains of Table 1, the face detection and tracking techniques (e.g., of FIGS. 3 and 4) may exhibit a detection accuracy close to that of pure face detection. For example, accuracies above 90% have been achieved for the videos of Table 1. Such accuracy and performance (e.g., 173 fps) significantly exceed current premium requirement for general camera and video camera.

Figure 9:
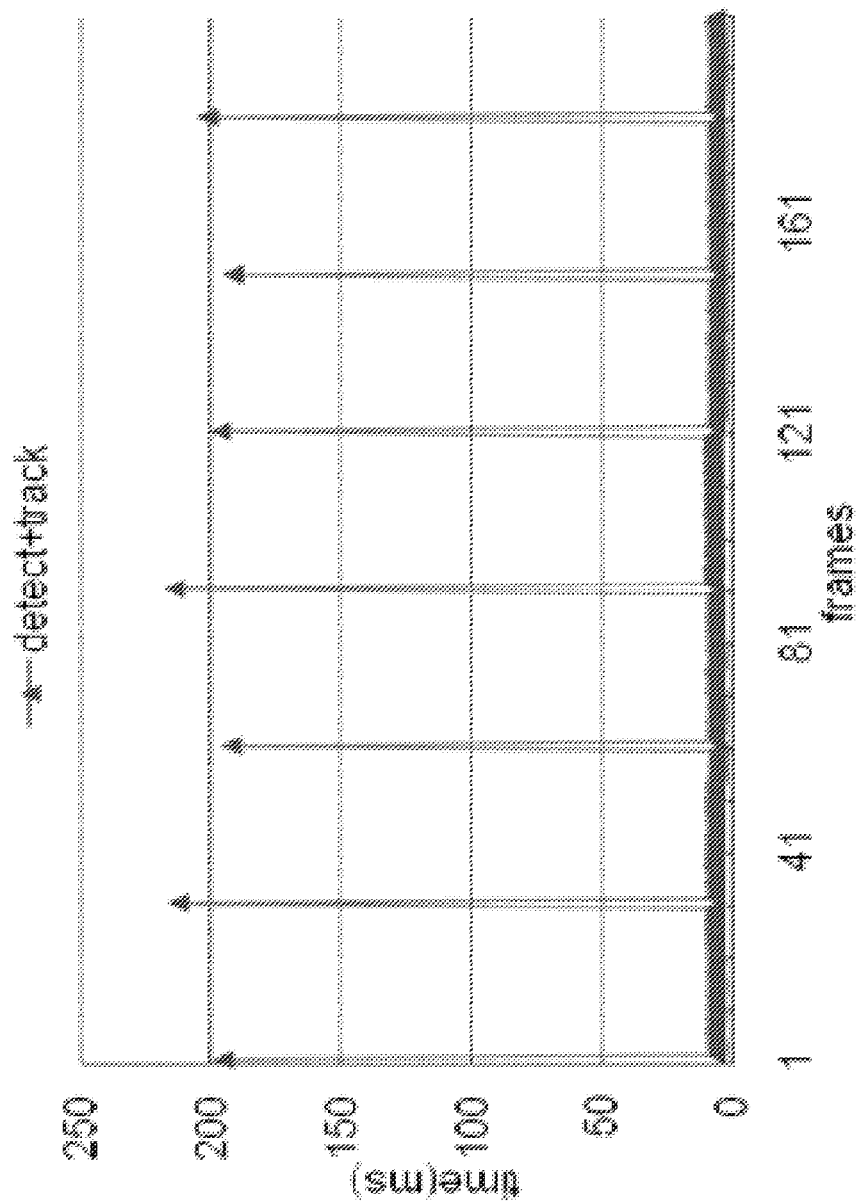
FIGS. 9 and 10 are graphs showing exemplary performance characteristics.
Figure 10:
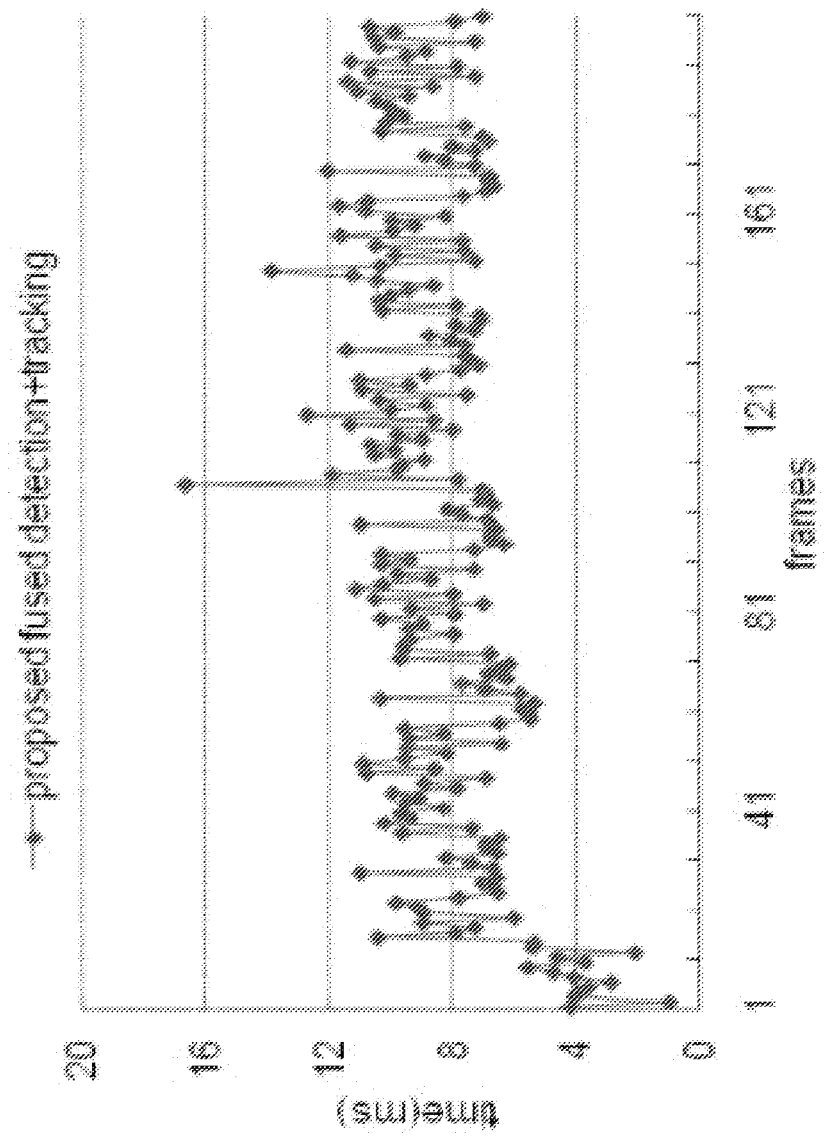

FIGS. 9 and 10 provide graphs showing further performance characteristics. In particular, FIGS. 9 and 10 compare the load distribution of the combined detection/tracking techniques (e.g., of FIGS. 3 and 4) and a direct detection/tracking method.

FIG. 9 shows performance data for a direct detection/tracking technique. This technique performs face detection at an interval of 30 frames, and only performs face tracking during the intermediate frames. As shown in FIG. 9, this technique leads to imbalanced load over time. In particular, each peak in FIG. 9 represents a full face detection task. Such peaks may cause system blockages for a short period of time. As a result, a user may suffer noticeable jitters.

On the other hand, FIG. 10 shows the combined technique described herein. As shown in FIG. 10, this technique exhibits a relatively equal execution time for each frame. This may advantageously result in a better user experience and shorter face detection delays for real-time video previews.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, embodiments are not limited to the employment of Viola and Jones' face detection techniques.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
    storing a plurality of image frames in a memory; and
    performing a face detection task on the plurality of image frames, the face detection task comprising multiple successive sets of tasks;
        wherein the successive sets employ progressively increasing detection region size;
        detecting whether sufficient computing resources exist for a sub-task;
        merging and filtering faces in the data structure in response to the determination that sufficient resources do not exist for the sub-task;
        wherein each of the multiple sets employs one or more detection regions having the corresponding detection region size; and
        wherein at least one of the multiple sets employs two or more partially overlapping detection regions having the corresponding detection region size.

2. The method of claim 1, further comprising allocating a resource budget for face detection sub-task performance in each of the plurality of image frames.

3. The method of claim 1, wherein said performing comprises, for each sub-task, scanning a window within a detection region, the detection region having the detection region size of the corresponding set.

4. The method of claim 3, wherein said performing comprises, for each sub-task, employing a plurality of classification stages, each classification stage operating on multiple windows concurrently.

5. The method of claim 1, wherein said performing comprises performing at least one of the sub-tasks in a corresponding one of the plurality of frames.

6. The method of claim 1, further comprising:
    performing a face tracking task on the plurality of image frames.

7. The method of claim 6, further comprising maintaining information regarding one or more previously detected faces.

8. An apparatus, comprising:
    a face tracking module to track one or more previously detected faces within an image frame; and
    a face detection module to perform one or more face detection tasks within the image frame;
    wherein each face detection task scans a window within a detection region; and
        wherein the successive sets employ progressively increasing detection region size, detect whether sufficient computing resources exist for a sub-task, and merge and filter faces in the data structure in response to the determination that sufficient resources do not exist for the sub-task; wherein each of the multiple sets employs one or more detection regions having the corresponding detection region size; and wherein at least one of the multiple sets employs two or more partially overlapping detection regions having the corresponding detection region size.

9. The apparatus of claim 8, further comprising a storage medium to store information regarding the one or more previously detected faces.

10. The apparatus of claim 9, wherein the storage medium further stores information regarding any faces detected by one or more face detection tasks.

11. The apparatus of claim 8, further comprising an image sensor to generate the image frame.

12. The apparatus of claim 8, further comprising a display to output the image frame.

13. The apparatus of claim 8, wherein the detection module includes a plurality of classification stages, each classification stage including multiple classification module to operate on multiple windows concurrently.

14. The apparatus of claim 8, wherein each of the face detection tasks are included in one of a plurality of task sets; and
    wherein each of the task sets employs a corresponding window size.

15. A non-transitory computer readable medium having stored thereon instructions that, when executed by a machine, cause the machine to:
    perform a face detection task on the plurality of image frames, the face detection task comprising multiple successive sets of tasks;
    wherein the successive sets employ progressively increasing detection region size;
    detect whether sufficient computing resources exist for a sub-task;
    merge and filter faces in the data structure in response to the determination that sufficient resources do not exist for the sub-task;
        wherein each of the multiple sets employs one or more detection regions having the corresponding detection region size; and
        wherein at least one of the multiple sets employs two or more partially overlapping detection regions having the corresponding detection region size.

16. The article of claim 15, wherein the instructions, when executed by a machine, cause the machine to:
    allocate a resource budget for face detection task performance in each of the plurality of image frames.

17. The article of claim 15, wherein said performing comprises, for each task, scanning a window within a detection region, the detection region having the detection region size of the corresponding set.

18. The method of claim 1 including using overlapping detection regions.

* * * * *